(12) United States Patent
Guo et al.

(10) Patent No.: US 12,081,402 B2
(45) Date of Patent: Sep. 3, 2024

(54) METHOD FOR ACCESSING NETWORK SLICE APPLIED TO A TERMINAL, ELECTRONIC DEVICE AND STORAGE MEDIUM

(71) Applicant: ZTE CORPORATION, Guangdong (CN)

(72) Inventors: Hailin Guo, Guangdong (CN); Dingyuan Tu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/927,842

(22) PCT Filed: Apr. 27, 2021

(86) PCT No.: PCT/CN2021/090343
§ 371 (c)(1),
(2) Date: Nov. 25, 2022

(87) PCT Pub. No.: WO2021/238554
PCT Pub. Date: Dec. 2, 2021

(65) Prior Publication Data
US 2023/0216740 A1     Jul. 6, 2023

(30) Foreign Application Priority Data

May 29, 2020  (CN) .......................... 202010477722.1

(51) Int. Cl.
*H04L 41/0893* (2022.01)
*H04L 41/12* (2022.01)
*H04L 45/02* (2022.01)

(52) U.S. Cl.
CPC .......... *H04L 41/0893* (2013.01); *H04L 41/12* (2013.01); *H04L 45/02* (2013.01)

(58) Field of Classification Search
CPC ............ H04L 41/0893; H04L 41/0894; H04L 41/122; H04L 41/34; H04L 41/342;
(Continued)

(56) References Cited

U.S. PATENT DOCUMENTS 10,602,422 B1 *  3/2020  Jagannatha ......... H04L 41/5041
11,265,808 B2 *  3/2022  Wang .................... H04W 24/08
(Continued)

FOREIGN PATENT DOCUMENTS

CN    109429277 A    3/2019
CN    109560948 A    4/2019
(Continued)

OTHER PUBLICATIONS

WIPO, International Search Report issued on Jul. 14, 2021.
(Continued)

*Primary Examiner* — Hee Soo Kim
(74) *Attorney, Agent, or Firm* — Li & Cai Intellectual Property (USA) Office (57) ABSTRACT

The present application discloses a method for accessing a network slice, an electronic device, and a storage medium. The method includes: acquiring access information of a target network slice according to an access request of an application for requesting to access the target network slice; generating a routing policy between the application and the target network slice according to the access information; and accessing the application to the target network slice according to the routing policy, so that the application performs network communication through the target network slice.

19 Claims, 4 Drawing Sheets

(58) Field of Classification Search
CPC ....... H04L 41/344; H04L 41/40; H04L 45/03; H04L 45/033; H04L 45/036; H04L 45/037; H04L 45/0377
USPC .......................................................... 709/223
See application file for complete search history.

(56) References Cited

U.S. PATENT DOCUMENTS

| | | | |
|---|---|---|---|
| 2018/0234915 | A1 | 8/2018 | Zait |
| 2020/0053622 | A1 | 2/2020 | Huang-Fu et al. |
| 2020/0187085 | A1* | 6/2020 | Jagannatha ......... H04L 41/0893 |
| 2020/0260371 | A1* | 8/2020 | Wang .................... H04W 60/00 |
| 2021/0058297 | A1* | 2/2021 | D'Acunto ........... H04L 41/0897 |
| 2021/0136653 | A1* | 5/2021 | Zhang ................... H04W 40/02 |
| 2021/0385724 | A1* | 12/2021 | Wang .................. H04L 41/5051 |
| 2023/0362060 | A1* | 11/2023 | Kerpez ................. H04W 24/02 |

FOREIGN PATENT DOCUMENTS

| | | | | |
|---|---|---|---|---|
| CN | 110324284 | A | 10/2019 | |
| CN | 110602761 | A | 12/2019 | |
| CN | 110621045 | A | 12/2019 | |
| KR | 20190018707 | A | 2/2019 | |
| WO | WO-2017218849 | A1 * | 12/2017 | ............. H04L 41/12 |
| WO | WO-2019111267 | A1 * | 6/2019 | ......... H04L 41/0806 |
| WO | WO-2021151507 | A1 * | 8/2021 | ......... H04L 41/0806 |

OTHER PUBLICATIONS

Huawei, Hisilicon. "Tailoring UE support and removing NSSP terminology," SA WG2 Meeting #124, S2-178835, Reno, U.S.A., Nov. 27-Dec. 1, 2017.
China Patent Office, First office action dated Jan. 19, 2023, for corresponding CN application No. 202010477722.1.
European Patent Office, Supplementary Search Report dated Sep. 28, 2023, for corresponding EP application No. 21813167.0.
Motorola Mobility, et al., "SA WG2 Meeting#120; S2-172501; Updates on UE Route Selection Policy", 3GPP Draft.
Motorola Mobility, et al., "SA WG2 Meeting#119; S2-171526, 23.501:UE Traffic Routing", 3GPP Draft.
Korean Patent Office, first Office action dated Apr. 24, 2024, for corresponding KR application No. 10-2022-7040128.

* cited by examiner

FIG. 7

METHOD FOR ACCESSING NETWORK SLICE APPLIED TO A TERMINAL, ELECTRONIC DEVICE AND STORAGE MEDIUM

CROSS-REFERENCE TO RELATED APPLICATIONS

The present application claims the priority of Chinese Patent Application No. 202010477722.1, filed on May 29, 2020, the contents of which are incorporated herein in their entirety by reference.

TECHNICAL FIELD

The present disclosure relates to the field of communication technologies, and in particular, to a method for accessing a network slice, an electronic device, and a storage medium.

BACKGROUND

With a rapid development of 5 Generation Mobile Communication Technology (5G), network slicing becomes an important selling point of operators for industry applications. The network slicing is a mode of on-demand networking, so that a plurality of virtual end-to-end networks (i.e., network slices) may be separated out based on a unified infrastructure, each network slice may obtain network resources being independent logically, and the network slices may be insulated from each other, therefore when an error or a fault occurs in any network slice, other network slices cannot be affected. Meanwhile, the operator may customize network slices as desired by the industry applications, for example, the network slices may have different characteristics, such as high throughput, low delay, high connection density and the like, which facilitates to providing differentiated services, and improving service quality of a product and user's experiences, so as to obtain more commercial benefits.

Applications in terminals are desired to be modified to support network slicing, however, each application may have different versions in different terminals, so that many users have been reluctant to upgrade the applications, and since each application may have a complex internal logic, a relatively high modification cost may be result in, which finally results in difficulty in popularizing services of network slicing.

SUMMARY

The present application is directed to providing a method for accessing a network slice, an electronic device, and a storage medium, so as to reduce cost of an application accessing the network slice and improve popularization of services of network slicing.

The present application provides a method for accessing a network slice, including: acquiring access information of a target network slice according to an access request of an application for requesting to access the target network slice; generating a routing policy between the application and the target network slice according to the access information; and accessing the application to the target network slice according to the routing policy, so that the application performs network communication through the target network slice.

The present application further provides an electronic device, including: at least one processor; and a memory communicatively connected with the at least one processor; the memory stores instructions to be executed by the at least one processor, the instructions, when executed by the at least one processor, causes the at least one processor to perform the method for accessing a network slice described above.

The present application further provides a computer-readable storage medium having a computer program stored therein, the computer program, when executed by a processor, performs the method for accessing a network slice described above.

DETAIL DESCRIPTION OF EMBODIMENTS

In order to make purposes, technical solutions, and advantages of the present application clearer, embodiments of the present application are described below with reference to the accompanying drawings. It should be understood by those of ordinary skill in the art that, in the embodiments of the present application, many technical details are proposed to enable readers to better understand the present application. However, the technical solutions claimed in the present application may be implemented without these technical details and various changes and modifications based on the following embodiments. The following embodiments are divided for convenience of description, and should not limit implementations of the present application, and the embodiments of the present application may be combined and quoted with each other if no conflict is incurred.

A terminal supporting a service of network slicing is directed to matching a data stream of an upper-layer application through a user equipment route selection policy (URSP), so as to obtain single network slice selection assistance information (S-NSSAI) in a designated network slice. During the terminal creating a protocol data unit (PDU) session, the S-NSSAI is carried to indicate the network slice to be requested by the terminal, and after the network accepting the request, the data stream of the application is to be transmitted in a corresponding slice link.

According to the 3GPP TS 23.503 standard, traffic descriptors in forms of a data network name (DNN) and connectivity capabilities expects an application to provide corresponding parameters, which means that only a new version of the application obtained by modifying codes of the application supports the service of network slicing. For example, if an application on a terminal supports network slicing in a form of the DNN, according to the standard, the application is desired to transmit a DNN message to a system framework of the terminal, and request a corresponding network slice from the system framework, the system creates a PDU session corresponding to the DNN message, and after the application receiving a callback based on the network slice, a binding work of the network slice is completed, and thus a routing path of the data stream corresponding to the application is established. At present, each commercial application may have different versions in different terminals, so that many users have been reluctant to upgrade the applications, which results in difficulty in rapid popularizing services of network slicing.

Figure 1:
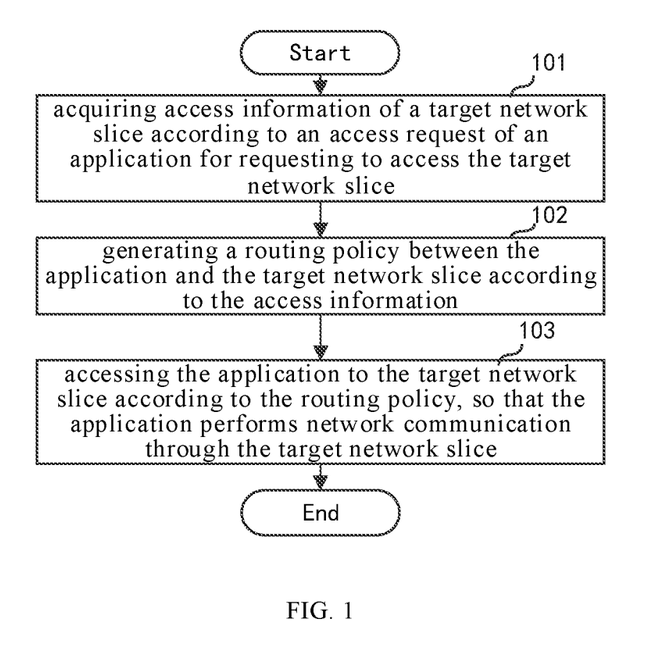
FIG. 1 is a flowchart of a method for accessing a network slice according to the present application.

The present application provides a method for accessing a network slice, applied to a terminal, such as a smartphone, a tablet computer, a desktop computer, or the like, including operations 101 to 103 as shown in a flowchart in FIG. 1.

At operation 101, acquiring access information of a target network slice according to an access request of an application for requesting to access the target network slice.

In some implementations, the method for accessing a network slice may be deployed on a system framework of the terminal, such as a system framework of an Android system. Before performing the operation 101, the terminal may pre-create a default network bearer for providing the default network bearer for an application without customizing a target network slice, so as to facilitate the application without customizing the target network slice to access a default network slice. In addition, the terminal may preset or query name information or information of other traffic descriptors of a default network slice of a current application, and may preset or query name information or information of other traffic descriptors of a target network slice customized by the current application.

In some implementations, before the acquiring access information of a target network slice, a monitoring request of the application for registering network monitoring may be intercepted, and the monitoring request is taken as the access request.

In some implementations, the application expects to access a target network slice, and may register network monitoring through a system interface of the terminal, the application initiates a monitoring request by registering the network monitoring, and after receiving the monitoring request, the system of the terminal configures a monitor for the application, so as to monitor whether a network is available, and in response to that the monitor informs that the target network slice is available, the application can access the target network slice. The system may intercept the monitoring request of the application, and take the monitor request as the access request.

By intercepting the monitoring request, an access expectation of the application may be rapidly acquired, so that the application can rapidly access the target network slice.

In some implementations, the access information includes one or any combination of followings: name information of the target network slice, identification information of the application, information of three tuples of the application.

In some implementations, content of the access information may be determined according to a number of target network slices to be accessed by the application, for example, if the number of the target network slices to be accessed by the application is greater than one, in order to distinguish the target network slices corresponding to different service traffics, the access information may include: name information of a target network slice, information of a traffic descriptor, such as information of IP three tuples, information of a domain name and the like.

Different target network slices have different names and traffic descriptors, and a type of service in each target network slice may be obtained from the traffic descriptor. Therefore, different service expectations of a same application can be distinguished, so that different service traffics reach respectively corresponding target network slices, which facilitates to generating a routing policy between the application and each target network slice conveniently and quickly in a subsequent process.

It should be understood that, after receiving the access request, the system of the terminal may be triggered to acquire the access information of the target network slice in various manners, for example, the terminal may read the access information from the application, or query the access information from a query interface communicated with a server to which an operator belongs. The manner for acquiring the access information of the target network slice may be determined according to a number of target network slices to be accessed by the application, for example, if the number of the target network slices to be accessed by the application is greater than one, the access information may be acquired by querying a server of the operator through the query interface; if one target network slice is to be accessed by the application, the access information may be directly queried through the system interface, for example, one target network slice is to be accessed by the application, the access information may include identification information of the application, and the identification information of the application, such as app_id2, may be queried through the system interface.

At operation 102, generating a routing policy between the application and the target network slice according to the access information.

In some implementations, a creation request is sent to a network bearer creation equipment according to the access information, so that the network bearer creation equipment creates a network bearer communicated with the target network slice according to the access information and returns prompt information of completing a creation of the network bearer.

In some implementations, the network bearer creation equipment may preset or update an URSP. That is, the URSP may be preset as desired by the operator; whether a stored URSP is a latest URSP may be detected, and if the stored URSP is not the latest URSP, an acquiring request may be initiated to a network of the operator, to acquire the latest URSP and update the stored URSP; or the network of the operator may actively issue the latest URSP, and the network bearer creation equipment receives the latest URSP and updates the stored URSP. Input parameters of the URSP are traffic descriptors, which include, but are not limited to: a DNN, identification information of an application, a fully qualified domain name (FQDN), IP three tuples, information of connectivity capabilities, and the like; an output parameter of the URSP is S-NSSAI. The network bearer creation equipment may be a modem connected with the terminal, the terminal may call an interface corresponding to a target network slice in the modem according to name information of the target network slice in the access information, trigger, through the interface, the modem to create the network bearer; after receiving a creation request for creating the network bearer, the modem acquires the name information of the target network slice, and creates the network bearer corresponding to the target network slice according to the latest URSP, for example, if the target network slice is denoted by dnn_x1, the target network slice denoted by dnn_x1 is determined by the modem, a network bearer for the terminal and the target network slice is created. The application communicates with the target network slice through the network bearer.

It should be understood that a network bearer corresponding to an expectation of an application may be created according to the expectation of the application, for example, ultra-reliable low-latency communication (URLLC) is created, i.e., dnn_x1, URLLC.

After creating the network bearer, the modem may return prompt information to the terminal, so that the terminal can perform subsequent processing.

In some implementations, a process of generating a routing policy between the application and the target network slice includes: creating a network interface connected with the target network slice; and configuring a routing relationship between the network interface and the application according to the access information, and taking the routing relationship as the routing policy.

In some implementations, after receiving the prompt information, the terminal allocates a network interface corresponding to the network bearer of the target network slice, and a connection between the network interface and the target network slice may be implemented through the network interface and the network bearer. The application may correspond to (i.e., access) only one target network slice, or a plurality of target network slices. If the application corresponds to one target network slice, a routing matching may be performed based on the identification information of the application, for example, an added routing policy is: if a packet belongs to an application A, the packet is allocated to a network interface 1.

If the application corresponds to a plurality of target network slices, each service traffic may be distinguished according to IP information, and then each service traffic is matched with a corresponding route, for example, an added routing policy is: if a packet belongs to the application A, and a target address IP of the packet is dst_ip_list1, then, the packet is allocated to the network interface 1; if a packet belongs to the application A, and a target IP address of the packet is dst_ip_list2, then, the packet is allocated to a network interface 2.

At operation 103, accessing the application to the target network slice according to the routing policy, so that the application performs network communication through the target network slice.

In some implementations, after a configuration of the routing policy is completed, the system may notify the application that the target network slice is available, and after receiving the notification, the application implements a network communication with the target network slice through the system interface. There are many ways to notify the application that the target network slice is available, for example, in an Android system, after a configuration of the routing policy is completed, a callback function may be used to notify the application that the target network slice is available.

Figure 2:
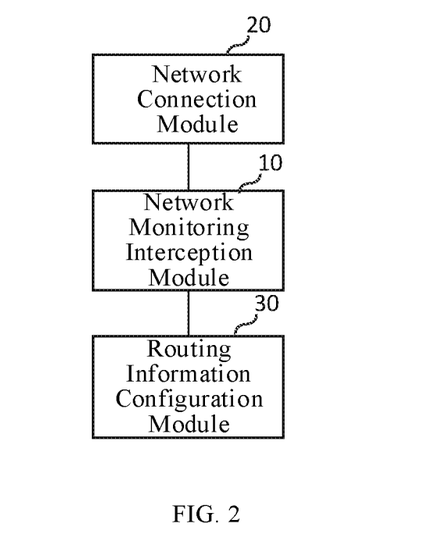
FIG. 2 is a block structural diagram of an apparatus for accessing a network slice according to the present application.
Figure 3:
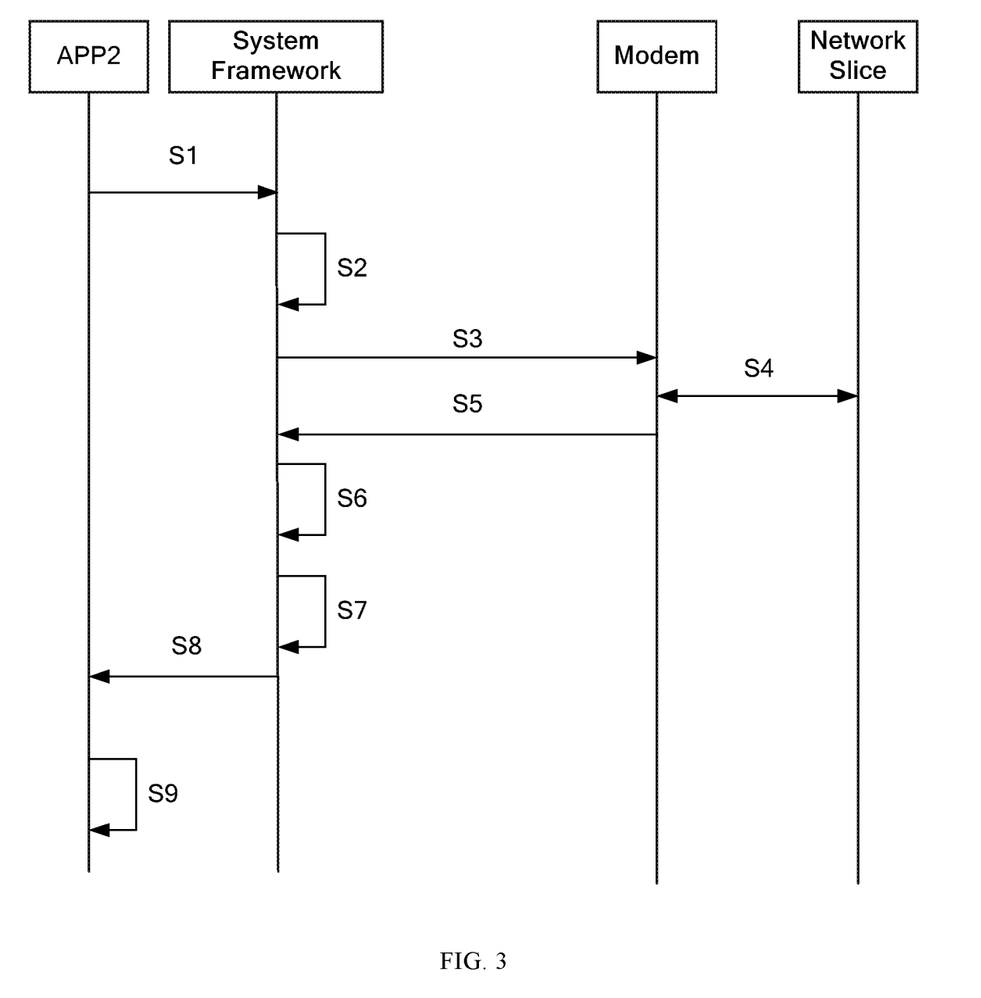
FIG. 3 is a schematic diagram of an interaction process of a method for accessing a network slice according to the present application.

The above operations may be executed on a system framework, and in order to facilitate understanding of a process of an application accessing a target network slice, in an example, three virtual modules are used to implement the process of the application accessing the target network slice. The virtual modules are shown in FIG. 2, and include a network monitoring interception module 10, a network connection module 20 and a routing information configuration module 30. FIG. 3 is a schematic diagram of interaction among modules in the system framework, and the process of the application accessing the target network slice is described below with reference to FIG. 3, the network monitoring interception module 10, the network connection module 20 and the routing information configuration module 30 are all deployed on the system framework of the terminal, and only the system framework is shown in FIG. 3. It should be noted that the modem presets or updates the URSP, and the terminal creates a default network bearer.

An application APP2 registers network monitoring through a system interface of the terminal, and the network monitoring interception module 10 executes operation S1 to intercept a monitoring request of the APP2, and take the monitoring request as an access request; the network monitoring interception module 10 executes operation S2 to query identification information of the APP2 through the system interface, i.e., query the identification information of the APP2 denoted by app id2; the network connection module 20 executes operation S3 to send a request of creating a network bearer to a modem; after receiving the request of creating the network bearer, the modem executes operation S4 to create the network bearer corresponding to the request according to the identification information of the APP2 and the URSP; the modem executes operation S5 to return prompt information of completing a creation of the network bearer; the network connection module 20 executes operation S6 to create a network interface corresponding to the network bearer, such as a network interface iface2. The routing information configuration module 30 executes operation S7 to configure a routing relationship between the APP2 and the iface2, in the example, a route matching may be implemented through the identification information of the APP2. The network monitoring interception module 10 executes operation S8 to notify the application APP2, through a registered callback function, that the target network slice is available. The APP2 executes operation S9 to access the target network slice, and communicate with the target network slice.

In the method for accessing the network slice provided by the present application, the access information of the target network slice is acquired according to the access request of the application, the routing policy between the application and the target network slice is generated according to the access information, the application can access the target network slice according to the routing policy; the application can support the network slicing service without being modified or being updated by users; a cost of the application accessing the target network slice is reduced, a difficulty for popularizing the network slicing service is lowered, and then the network slicing service can be rapidly deployed, so that the popularization of the network slicing service is facilitated.

The present application further provides a method for accessing a network slice, which is similar as the method described above, and a detailed description of the acquiring access information of a target network slice is given. As shown in a flowchart in FIG. 4, the method includes following operations 201 to 204.

Figure 4:
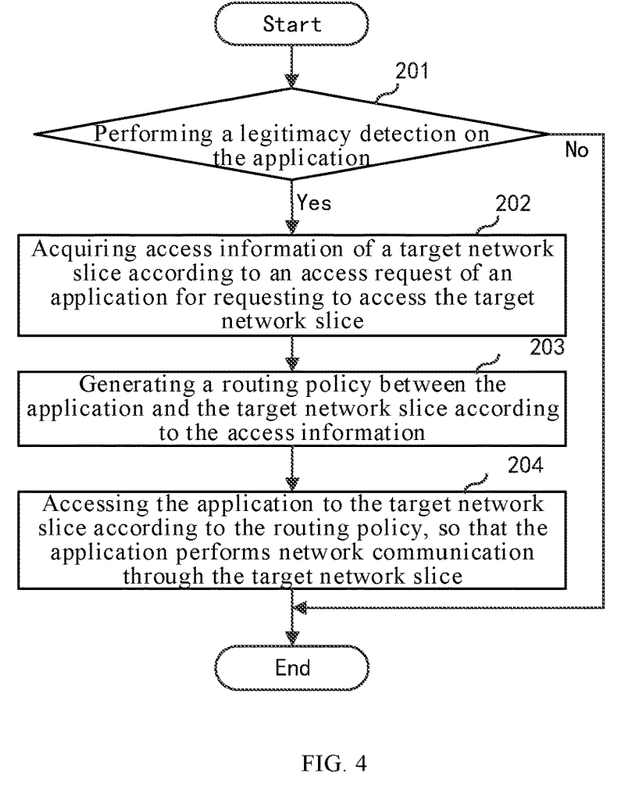
FIG. 4 is a flowchart of a method for accessing a network slice according to the present application.

At operation 201, performing a legitimacy detection on an application, and in response to that the application is determined to be a legitimate application, executing operation 202, in response to that the application is determined to be an illegitimate application, ending the process.

In some implementations, identification information of the application may be acquired to determine whether the application is a legitimate application, for example, a white list of legitimate applications may be pre-stored, and whether the white list includes identification information of the current application may be determined, if the white list includes the identification information of the current application, the application is determined to be a legitimate application, and if the white list does not include the identification information of the current application, the application is determined to be an illegitimate application. In addition, a validity period of certificate of the application may be used to determine whether the application is a legitimate application, for example, whether the validity period of certificate expires may be determined.

At operation 202, acquiring access information of a target network slice according to an access request of the application for requesting to access the target network slice.

In some implementations, the access information may be queried from a query interface, the query interface communicates with a server to which an operator belongs.

In some implementations, the server to which the operator belongs communicates with the terminal through the query interface, the access information may be queried from the query interface. In response to that any target network slice is customized for the application, the access information of the target network slice customized by the application is queried; in response to that no target network slice is customized for the application, information of a default network slice is queried, and the information of the default network slice is taken as the access information.

According to the identification information of the application, whether any target network slice is customized for the application may be queried, in response to that no target network slice is customized for the application, information of a default network slice is queried, and the information of the default network slice is taken as the access information, the information of the default network slice may be name information of the network slice. In response to that any target network slice is customized for the application, the access information of the target network slice customized by the application is queried, it should be understood that, if one target network slice is customized for the application, only the name information of the target network slice may be queried, if more than one target network slice is customized by the application, the name information, information of IP three tuples, identification information and the like of the target network slice may be queried; when a plurality of target network slices are customized, content contained in the access information is more detailed, so that a routing policy can be reasonably configured in subsequent process.

The access information of the target network slice may be queried as desired by the application, so as to meet different expectations of the application.

At operation 203, generating a routing policy between the application and the target network slice according to the access information.

The operation 203 is substantially the same as the operation 102 described above, and thus is not repeated here.

At operation 204, accessing the application to the target network slice according to the routing policy, so that the application performs network communication through the target network slice.

The operation 204 is substantially the same as the operation 103 described above, and thus is not repeated here.

Figure 5:
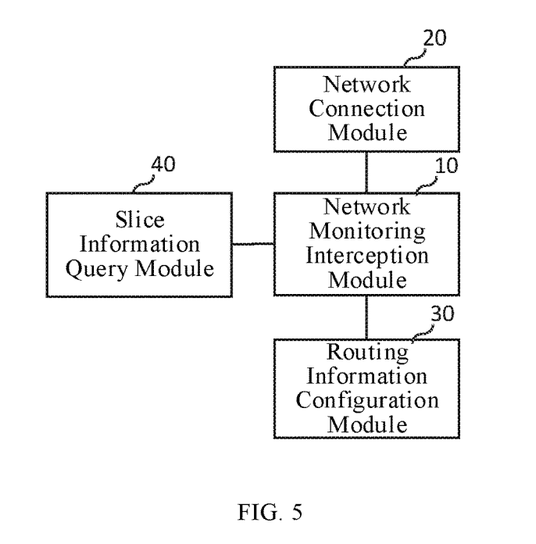
FIG. 5 is a block structural diagram of an apparatus for accessing a network slice according to the present application.
Figure 6:
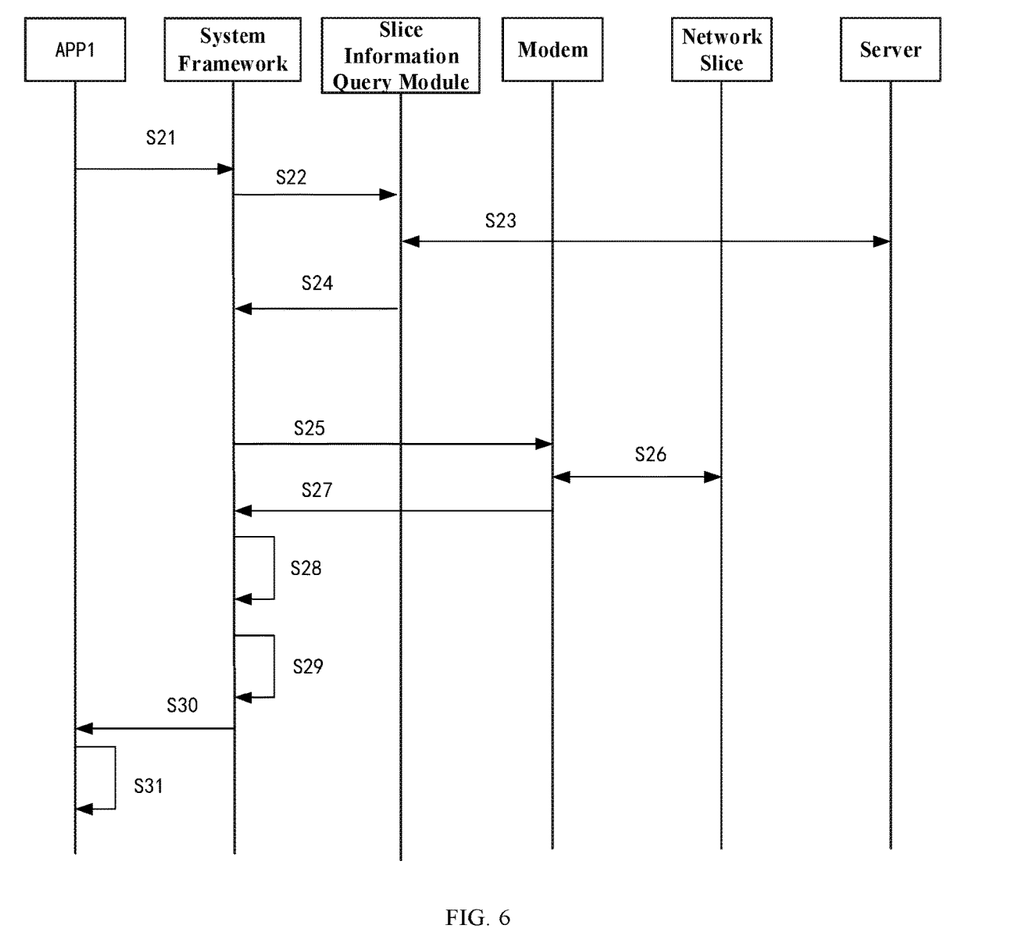
FIG. 6 is a schematic diagram of an interaction process of a method for accessing a network slice according to the present application.

The above operations may be executed on a system framework, and in order to facilitate understanding of a process of an application accessing a target network slice, in an example, four virtual modules are used to implement the process of the application accessing the target network slice. The virtual modules are shown in FIG. 5, and include a network monitoring interception module 10, a network connection module 20, a routing information configuration module 30 and a slice information query module 40. FIG. 6 is a schematic diagram of interaction among modules in the system framework, and the process of the application accessing the target network slice is described below with reference to FIG. 6, the network monitoring interception module 10, the network connection module 20, the routing information configuration module 30 and the slice information query module 40 are all deployed on the system framework of the terminal, and for convenience of description, the slice information query module 40 inside the system framework is denoted by a dashed box in FIG. 6. The system framework shown in FIG. 6 includes the network monitoring interception module 10, the network connection module 20 and the routing information configuration module 30. It should be noted that the modem presets or updates the URSP, and the terminal creates a default network bearer.

An application APP1 registers network monitoring through a system interface of the terminal, and the network monitoring interception module 10 executes operation S21 to intercept a monitoring request of the APP1, and take the monitoring request as an access request; the network monitoring interception module 10 executes operation S22 to query from the slice information query module 40 whether the application customizes information of a DNN and other traffic descriptors; the slice information query module 40 executes operation S23 to perform an legitimate detection on the application, and query access information from a server to which the operator belongs; the slice information query module 40 executes operation S24 to return the access information, if the APP1 does not customize the DNN, a default DNN is returned. If more than one DNN is customized, the access information further includes information of IP three tuples, such as dnn x1, ip list1; dnn_x2, ip list2. The network connection module 20 executes operation S25 to send a request of creating a network bearer to a modem; after receiving the request of creating the network bearer, the modem executes operation S26 to create the network bearer corresponding to the request according to the identification information of the APP1 and the URSP; the modem executes operation S27 to return prompt information of completing a creation of the network bearer; the network connection module 20 executes operation S28 to create a network interface corresponding to the network bearer, such as a network interface iface2. The routing information configuration module 30 executes operation S29 to configure a routing relationship between the APP1 and the iface1, in the example, a route matching may be implemented through the identification information and IP three tuples of the APP1. The network monitoring interception module 10 executes operation S30 to notify the application APP1 through a registered callback function that the target network slice is available. The APP1 executes operation S31 to access the target network slice, and communicate with the target network slice.

It should be understood that the application may access a plurality of target network slices, processes of accessing other target network slices are similar to the above process, and thus are not repeated here.

In the method for accessing a network slice provided in the present application, the access information of the target network slice may be acquired by querying the server to which the operator belongs, and the acquired access information is relatively more accurate.

Figure 7:
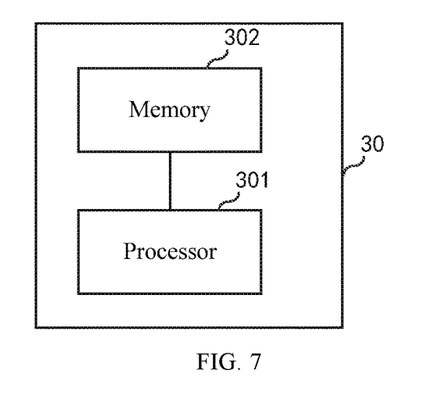
FIG. 7 is a block structural diagram of an electronic device according to the present application.

An electronic device is further provided in the present application, as shown in FIG. 7, the electronic device 30 includes at least one processor 302; and a memory 301 communicatively connected with the at least one processor 302; the memory 301 stores instructions to be executed by the at least one processor, the instructions, when executed by the at least one processor 302, causes the at least one processor 302 to perform the method for accessing a network slice described above.

The memory 301 and the processor 302 are connected through a bus, the bus may include any number of interconnected buses and bridges, and connects various circuits of one or more processors 302 and the memory 301. The bus may further connect various circuits of peripherals, voltage regulators, power management circuits, and the like, which are well known in the art, and thus are not repeated here. A bus interface provides an interface between the bus and a transceiver. The transceiver may be one element or a plurality of elements, such as a plurality of receivers and transmitters, providing a means for communicating with various other apparatuses over a transmission medium. Data processed by the processor 302 is transmitted over a wireless medium through an antenna, and the antenna further receives data and transmits the data to the processor 302.

The processor 302 manages the bus, performs general processing, and may further provide various functions including timing, peripheral interfaces, voltage regulation, power management, and other control functions. The memory 301 may be used to store data used by the processor 302 in performing operations.

The present application further provides a computer-readable storage medium storing a computer program. The computer program, when executed by a processor, implements the above method for accessing a network slice. The computer-readable storage media includes transitory or non-transitory, removable or non-removable medium implemented in any method or technology for storing information such as computer-readable instructions, data structures, computer program modules or other data.

It should be understood, by those skilled in the art, that all or part of the operations in the method for accessing a network slice described above may be implemented by a program instructing related hardware, the program is stored in a storage medium and includes several instructions for causing a device (which may be a single-chip computer, a chip, or the like) or a processor to execute all or part of operations of the method for accessing a network slice provided in the present application. The aforementioned storage medium includes: a U-disk, a read-only memory (ROM), a random access memory (RAM), a removable hard disk, a magnetic disk, or an optical disk, and various medium capable of storing program codes.

It should be understood by those skilled in the art that all or some of the operations in the method, the functional modules/components in the apparatus disclosed above may be implemented as software (which may be implemented by computer program codes being executable by a computing device), firmware, hardware, or suitable combinations thereof. In a hardware implementation, the division between the functional modules/ components stated above does not correspond to the division of physical components; for example, one physical component may have a plurality of functions, or one function or operation may be performed through cooperation of several physical components. Some or all of the physical components may be implemented as software to be executed by a processor, such as a central processing unit, a digital signal processor or a microprocessor, or may be implemented as hardware, or may be implemented as an integrated circuit, such as an application specific integrated circuit.

It should be understood by those skilled in the art that the above implementations are examples of implementations of the present application, in practical applications, various changes in form and details may be made without departing from the scope and spirit of the present application.

What is claimed is:

1. A method for accessing a network slice applied to a terminal, comprising:
   acquiring access information of a target network slice according to an access request of an application of the terminal for requesting to access the target network slice;
   generating a routing policy between the application of the terminal and the target network slice according to the access information; and
   accessing the application to the target network slice according to the routing policy, so that the application of the terminal performs network communication through the target network slice,
   wherein the generating a routing policy between the application and the target network slice according to the access information comprises:
   creating a network interface of the terminal to be connected with the target network slice; and
   configuring a routing relationship between the network interface and the application according to the access information, and taking the routing relationship as the routing policy, so that the application of the terminal accesses the target network slice through the network interface of the terminal.

2. The method of claim 1, further comprising:
   before the creating a network interface connected with the target network slice, sending a creation request to a network bearer creation equipment according to the access information, so that the network bearer creation equipment creates a network bearer communicated with the target network slice according to the access information and returns prompt information of completing a creation of the network bearer.

3. The method of claim 1, wherein the acquiring access information of a target network slice according to an access request of an application for requesting to access the target network slice comprises:
   reading the access information from the application.

4. The method of claim 3, further comprising:
   performing a legitimacy detection on the application, and in response to that the application is determined to be a legitimate application, executing the acquiring access information of a target network slice according to an access request of an application for requesting to access the target network slice.

5. The method of claim 3, wherein the access information comprises one or any combination of followings:
   name information of the target network slice, identification information of the application, information of three tuples of the application.

6. The method of claim 3, further comprising:
   before the acquiring access information of a target network slice according to an access request of an application for requesting to access the target network slice, intercepting a monitoring request of the application for registering network monitoring, and taking the monitoring request as the access request.

7. The method of claim 1, wherein the acquiring access information of a target network slice according to an access request of an application for requesting to access the target network slice comprises:

querying the access information from a query interface, wherein the query interface is communicated with a server to which an operator belongs.

8. The method of claim 7, wherein the querying the access information from a query interface comprises:
in response to that any target network slice is customized for the application, querying the access information of the target network slice customized by the application;
in response to that no target network slice is customized for the application, querying information of a default network slice, and taking the information of the default network slice as the access information.

9. The method of claim 7, further comprising:
performing a legitimacy detection on the application, and in response to that the application is determined to be a legitimate application, executing the acquiring access information of a target network slice according to an access request of an application for requesting to access the target network slice.

10. The method of claim 7, wherein the access information comprises one or any combination of followings:
name information of the target network slice, identification information of the application, information of three tuples of the application.

11. The method of claim 7, further comprising:
before the acquiring access information of a target network slice according to an access request of an application for requesting to access the target network slice, intercepting a monitoring request of the application for registering network monitoring, and taking the monitoring request as the access request.

12. The method of claim 1, further comprising:
performing a legitimacy detection on the application, and in response to that the application is determined to be a legitimate application, executing the acquiring access information of a target network slice according to an access request of an application for requesting to access the target network slice.

13. The method of claim 1, wherein the access information comprises one or any combination of followings:
name information of the target network slice, identification information of the application, information of three tuples of the application.

14. The method of claim 1, further comprising:
before the acquiring access information of a target network slice according to an access request of an application for requesting to access the target network slice, intercepting a monitoring request of the application for registering network monitoring, and taking the monitoring request as the access request.

15. An electronic device, comprising: at least one processor; and
a memory communicatively connected with the at least one processor,
wherein the memory stores instructions to be executed by the at least one processor, the instructions, when executed by the at least one processor, causes the at least one processor to perform the method of claim 1.

16. A non-transitory computer-readable storage medium having a computer program stored therein, the computer program, when executed by a processor, performs the method of claim 1.

17. The method of claim 1, further comprising:
performing a legitimacy detection on the application, and in response to that the application is determined to be a legitimate application, executing the acquiring access information of a target network slice according to an access request of an application for requesting to access the target network slice.

18. The method of claim 1, wherein the access information comprises one or any combination of followings:
name information of the target network slice, identification information of the application, information of three tuples of the application.

19. The method of claim 1, further comprising:
before the acquiring access information of a target network slice according to an access request of an application for requesting to access the target network slice, intercepting a monitoring request of the application for registering network monitoring, and taking the monitoring request as the access request.

* * * * *